United States Patent Office 3,591,402
Patented July 6, 1971

---

3,591,402
PRINTING ON POLYURETHANE SURFACES
Cyrus L. Blackfan, North Olmstead, Ohio, assignor to
The B. F. Goodrich Company, New York, N.Y.
No Drawing. Filed Oct. 1, 1969, Ser. No. 862,966
Int. Cl. B41m *1/30*
U.S. Cl. 117—12                               9 Claims

ABSTRACT OF THE DISCLOSURE

An improved process for printing on polyurethane surfaces requires first printing with ink on the polyurethane surface and thereafter heating to a temperature above 212° F.

BACKGROUND OF THE INVENTION

Polyurethanes in the form of elastomers are well known. These materials, particularly in sheet or film form, have many applications because of their toughness combined with high elongation, tensile strength, impact strength, puncture resistance and abrasion resistance. It is desirable to print on such sheet or film material but to date it has been found to be difficult to obtain permanent printing on these polyurethane materials. Other plastics such as polyethylene are also difficult to print on. Several techniques have been applied successfully to polyethylene, for example, U.S. Pat. 3,018,189 discloses treating polyethylene surfaces to an electrical discharge to effect a modification of the surface and thereafter printing thereon. U.S. Pat. 2,648,097 discloses a process for directing a gas flame onto a polyethylene surface to change the surface and thereafter print thereon. Neither of these techniques, as well as others known in the plastic art, have been successful in providing adherent printing on polyurethane surfaces.

SUMMARY OF THE INVENTION

It has now been found that by first printing with ink on a polyurethane surface and thereafter heating the printing polyurethane surface to a temperature above 212° F., but below a temperature that causes distortion or degradation of the polymer, that a permanent bond is formed between the ink and polyurethane.

DETAILED DESCRIPTION

Elastomeric polyurethanes are readily prepared from a variety of compounds having terminal functional groups reactive with organic diisocyanates. Normally used are hydroxyl-terminated compounds. The hydroxyl-terminated compounds usually have molecular weights greater than about 300 to 400. A great variety of such hydroxyl-terminated compounds have been prepared and proposed for commercial applications. The three most commonly used materials are hydroxyl-terminated polyesters, polyethers and polylactones. In the preparation of one type of elastomeric film and sheet materials, hydroxyl-terminated polyesters, polyethers or polylactones alone or in admixture, having molecular weights greater than about 400, and difunctional chain extenders as glycols, are reacted with the organic diisocyanate. While better film materials are usually obtained by reacting the organic diisocyanate with the polyester, polyether or polylactone and a difunctional chain extender as an alkylene glycol; the so-called prepolymer technique may be used where an excess of organic diisocyanate is first reacted with the polyester, polyether or polylactone and then the difunctional additive added, normally in amounts to react with substantially all of the free isocyanate groups.

The hydroxyl polyesters are hydroxyl-terminated polyesters having molecular weights between about 500 and 400 and acid numbers less than 10. The basic polyesters utilized include polyesters prepared by the esterification of aliphatic dicarboxylic acids including for example, adipic, succinic, pimelic, suberic, azelaic, sebacic and the like or their anhydrides. Minor proportions of aromatic dicarboxylic acids may be used. Useful acids are those aliphatic dicarboxylic acids of the formula

HOOC—R—COOH where R is an alkylene radical containing 2 to 8 carbon atoms. The glycols used in the preparation of the polyesters by reaction with the dicarboxylic acids are aliphatic glycols containing between 2 and 10 carbon atoms such as ethylene glycol, propanediol, butanediol, hexamethylenediol-1,6, octamethylenediol-1,8,2-ethylhexyl glycol-1,6 and the like. Preparation of typical polyesterurethanes from polyesters useful in film form are described in U.S. Patent 2,871,218.

The polyacetals or poly(epsilon-caprolactone)diols are the polyester reaction products of lactones and bifunctional compounds having two reactive sites capable of opening the lactone ring. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane, butanediol-1,4, hexamethylene diol-1,6 and the like. Ethylene glycol provides excellent polyesters.

The lactones preferred for preparing the polyesters are epsilon-caprolactones having the general formula

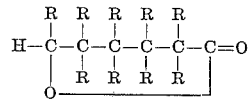

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, γ-methyl-epsilon-caprolactone, β-methyl-epsilon-caprolactone, dimethyl-epsilon-caprolactone and the like. The lactones are polymerized readily by heating with the bifunctional reactant to a temperature of about 100 to about 200° C. Catalysts may be employed if desired. Particularly preferred are poly(epsilon-caprolactone) diols having molecular weights in the range of about 500 to about 5000.

The hydroxyl(polyalkylene oxide)s, or polyethers, preferably are essentially linear hydroxyl-terminated compounds having ether linkages as the major linkage joining carbon atoms. The molecular weights may vary between about 500 and 4000.The hydroxy(polyalkylene oxide)s found useful include hydroxyl poly(methylene oxide)s as hydroxyl poly(tetramethylene oxide), hydroxyl poly(trimethylene oxide), hydroxyl poly(hexamethylene oxide), hydroxyl poly(1,2-propylene oxide)s, hydroxyl poly(ethylene oxide)s and the like of the formula $HO(CH_2)_nO_xH$ wherein $n$ is a number from 2 to 6 and $x$ is an integer. Preparation of polyurethanes from these polyethers is described in U.S. Pat. 2,899,411.

The glycols that may be used with the polyesters, polyethers or polyacetals and the organic diisocyanate normally are aliphatic glycols containing 2 to 8 carbon atoms and more preferably 3 to 6 carbon atoms. Better results have generally been obtained with glycols which do not contain unsaturation. Typical glycols which have been employed include ethylene glycol, propylene glycol, butanediol-1,4, hexanediol, isooctyl diol, neopentyl glycol and the like.

The amount of glycol used with the polyethers or polyacetals, polyesters, and reacted with the diisocyanate may vary from about 0.1 to 12 mols per mol of polyester or polyether. Excellent polyurethanes are obtained with a molar ratio of one mol of polyester or polyether and more than one, as 2 to 5 mols of the glycol. Substituted glycols also may be used.

The organic diisocyanates which are reacted with the polyesters, polyethers or polyacetals will include, for example, both aliphatic and aromatic diisocyanates, although the aromatic diisocyanates generally result in polymers with a more desirable balance of required physical properties. Such diisocyanates include for example, hexamethylene diisocyanate. The aromatic diisocyanates include naphthalene-1,5-diisocyanate, diphenyl methane-4,4'-diisocyanate, m-tolylene diisocyanate, p-phenylene diisocyanate, dichlorodiphenyl methane diisocyanate, dimethyl diphenyl methane diisocyanate, bibenzyl diisocyanate, diphenyl ether diisocyanates, bitolylene diisocyanates and the like. A particularly useful group of diisocyanates are those of the formula

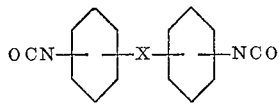

wherein X may be a valence bond, an alkylene radical containing 1 to 5 carbon atoms, NR where R is an alkyl radical, oxygen, sulfur, sulfoxide, sulfone and the like.

Usually about equimolar ratios of diisocyanate and diols may be used. When a glycol is also used, the ratio of reactants employed may be varied from about 1.5 to 13 mols of organic diisocyanate per mol of polyesters or polyethers with 0.5 to 12 mols of the glycol. The amount of organic diisocyanate used is dependent on the total amount of glycol and polyesters or polyethers and normally is a molar amount essentially equivalent to the total of these latter two reactants so that there are essentially no free unreacted isocyanate groups remaining in the polymer. Excellent films have been obtained when a molar ratio of one mol of polyester or polyether of molecular weights about 800 to 2000, 1 to 2 mols of glycol reacted with 2 to 3 mols of the aromatic diisocyanate. While equimolar ratios are preferred, it will be understood that an excess of any reactant, preferably less than 10%, as 5%, of excess organic diisocyanate can be used, although larger amounts of diisocyanate have been used.

While essentially non-cross-linked polyurethanes are particularly suitable for film as well as sheet and molding items, cross-linked or cured polyurethanes may also be printed in accordance with the process of this invention. These polyurethane elastomeric materials are well known and are prepared in a variety of ways as is described in the patent literature. For example, hydroxyl-terminated polyesters, polyesteramides, polyalkylene ether glycols and the like of molecular weights from about 800 to 3000 or higher are reacted with organic isocyanates, generally with an excess of the diisocyanate. The resulting polyurethane elastomers are cured or vulcanized by mixing with additional organic diisocyanate where only a slight excess of isocyanate is used to make the polyurethane; or if a substantial excess of organic diisocyanate is used in making the polyurethane, then the isocyanate-terminated polyurethane is mixed or treated with polyfunctional additives such as water, diamines, glycols, and the like that result in curing or vulcanization. The excess diisocyanate present or added is in amounts from about 1 to 25%, preferably 3 to 15 weight parts per 100 weight parts of polyurethane elastomer. Regardless of the source of the polyurethane, the process of this invention may be applied to obtain improved printing on surfaces thereof.

Methods of printing normally used in printing on plastic surfaces are varied and many. Of particular utility are flexography, offset, gravure and the screen processes. In flexography, solvent-type inks are transferred by raised rubber or composition printing surfaces. In applying the process of this invention, a film of polyurethane is printed in a flexographic roll press in one or more colors and as the printed film is taken off the impression cylinder, it is heated as by a hot roll, passed through an oven, under a hot air gun or by thermal impulse, so that the surface of the film is at a temperature in the range of about 300° F. to 400° F. for about 1 to 10 seconds whereby the ink is set to the polyurethane and becomes abrasion resistant. In using a central impression drum press for flexographic printing, the printed film is similarly heated either before going on the take-off or rewind roll; or after being rewound on a roll may thereafter be heated as described herein. Inks normally used are the solvent base type which are fast drying and are described in the literature.

Offset printing is a method whereby heavy pigmented inks are transferred by plain metal printing surfaces and water wetted areas keep non-printing surfaces free of ink. The treated film or sheet may be heated after passing the plate and impression cylinder, or later, as has been described.

In gravure or intaglio printing, fast drying fluid inks are transferred from minute cells in a plate. The inks are generally hydrocarbon, alcohol, lacquer and water base which are very fluid and dry rapidly by evaporation of solvent. Gravure processes include both sheet fed and web fed systems and in a web system the printed polyurethane may be heated as described, before the rewind roll, or after being rewound the printed polyurethane film may be later heated as described.

Silkscreen or stencil printing involves a squeegee forcing ink through an open mesh of silk, metal or rayon. Solvent, oil, rubber and water base inks having good drying characteristics are employed. There are semi-automatic screen processes that employ a drying oven which may be extended or operated at higher temperatures to provide the advantages of heating the printing on polyurethane sheet or film.

While printing is normally done on polyurethane film or sheet, the process of this invention may be employed to print on other polyurethane articles, as mechanical goods, if desired.

In accordance with this invention, the polyurethane film or sheet is first printed and thereafter heated to fix the ink thereon. While the printing could be done while the sheet or film is in a heated condition, better results are obtained by first printing and then heating and this procedure is much less cumbersome and costly.

Heating of the printed film or sheet may be done in many ways known to those skilled in the art. The printed sheet or film may be heated on a hot bar, by thermal impulse, over heated rolls, by a hot air gun, in an oven and the like. The degree and time of heating employed is readily determined by those skilled in the art.

The printed article must be heated to a temperature greater than 212° F. but below a temperature that causes distortion or degradation of the polymer. Most film will be in thicknesses of 0.5 to 10 mil. Sheet may be of any thickness. Heating times and conditions which have been found to be satisfactory for 2 mil films have been found to be about 10 seconds at 325° F. and one second at 375° F. Normally, it is necessary only to heat the film at a temperature equivalent to between about 300° F. to 400° F. at a time of about ½ to 10 seconds for film of 2 to 10 mil thickness. For most efficient results the polyurethane surface should reach a temperature of 300–400° F. Heating for longer periods or at higher temperatures above the required minimum to set the ink on the surface is not necessary. Other heating conditions substantially equivalent to these are readily determined. It is believed that to obtain maximum adhesion between ink and polyurethane, that the polyurethane surface need be heated only to change the crystalline structure of the polyurethane and this takes place at a temperature above 200° F., normally at temperatures above about 300° F. Exact times and temperatures within this range will be readily established by those skilled in the art, depending on the particular polyurethane employed, the thickness, the type of heating used, the nature of the ink and the like. Simple experiments readily establish these factors for optimum adhesion with a given polyurethane and ink.

Printing inks suitable for and useful in printing on polyurethanes are adequately described in the Printing Ink Manual, Ed. Reg. F. Bowles, W. Heffer & Sons, Ltd., Cambridge, 1963; and in Kirk-Othmer, Encyclopedia of Chemical Technology, 2nd edition, 1966, Interscience, pages 611–631. A great variety of inks may be employed to print on polyurethanes when the process of this invention is used. Inks containing strong polar solvents such as tetrahydrofuran and methyl ethyl ketone are not preferred since such solvents may attack the surface of the polyurethane. Generally any inks containing weakly polar or non-polar solvents or diluents may be employed. Particularly useful for printing on polyurethanes are flexographic inks that contain volatile solvents. Such inks include alcohol dilutable inks containing nitrocellulose, polyamide inks, dye inks, acrylic inks and water-base inks as are described in the literature cited. Inks generally useful for printing on plastic materials are satisfactorily employed on polyurethanes if used in accordance with the process of this invention.

To demonstrate the process and advantages of this invention, two different polyurethane films prepared (1) from a polyurethane of poly(tetramethylene adipate), 1,4-butanediol and diphenylmethane diisocyanate in a molar ratio of about 1 mol of polyester, 2 mols of 1,4-butanediol and 3 mols of diisocyanate as described in U.S. Pat. 2,871,218, and (2) a polyurethane prepared from about 1 mol of hydroxyl poly(tetramethylene oxide), 2 mols of 1,4-butanediol and 3 mols of diphenylmethane diisocyanate as described in U.S. Patent 2,899,411, in film form of 2 mil thickness were written on with a standard fountain pen, both blue or black ink; a ball point pen; a felt marking pen; printed with a stamp inked from a stamp pad; water base casein ink; India ink; and commercially printed by flexography using an acrylic base flexographic ink. A good bond was not obtained with any of these inks and the polyurethane surface and even after drying the printing was easily abraided and removed as by pencil eraser and flaked off when the polyurethane films were stretched or flexed. When, however, such printed films were heated at a temperature of about 350° F. for 5 to 10 seconds in an air oven, and an impulse heating unit, the ink abrasion was greatly improved and was not easily removed by abrasion or by stretching.

One standard test to determine satisfactory printing in the industry is to apply to a printed surface a pressure-sensitive (Scotch) tape on cellophane backing and remove by peeling the tape parallel to the printed surface. The writing and printing on the polyurethane surface as described above were cleanly removed from the polyurethane surface by Scotch tape. With the printed polyurethane film that had been heated as described, the ink adhered to the polyurethane surface and could not be removed by the Scotch tape.

Polyesterurethane film printed in a commercial flexographic roll press and aged for two years had the printing readily removed with Scotch tape. Sections of this printed and aged film were heated in an air oven at 311° F. for 15 seconds and 365° F. for 10 seconds. After cooling, the printing could not be removed from the polyurethane surface by the standard Scotch tape test.

Equally good results were obtained with polyurethanes obtained from poly(epsilon-caprolactone)diol, poly(ethylene adipate), poly(tetramethylene adipate) extruded with ethylene glycol, and commercially available polyurethanes.

I claim:

1. The method comprising printing with ink on a polyurethane surface and thereafter heating at a temperature greater than about 212° F. to a temperature below that causing degradation of the polyurethane.

2. The method of claim 1 wherein the polyurethane is a polyurethane of a hydroxyl-terminated polyester, polyether or polylactone having a molecular weight greater than 300 and an organic diisocyanate.

3. The method of claim 2 wherein the temperature is in the range of greater than 212° F. to about 500° F.

4. The method of claim 3 wherein the surface of the polyurethane is heated to about 300 to 400° F.

5. The method of claim 3 wherein the polyurethane is heated substantially equivalent to 1 to 10 seconds at 325° to 375° F. for films of 1 to 5 mil thickness.

6. The method of claim 2 wherein the polyurethane is a reaction product of a hydroxyl-terminated polyester having a molecular weight from 800 to 2500, an aliphatic glycol containing 2 to 6 carbon atoms and an aromatic diisocyanate in a molar ratio of about 1 mol of polyester, 1 to 5 mols of glycol and an amount of diisocyanate substantially equimolar to the polyether and glycol.

7. The method of claim 2 wherein the polyurethane is a reaction product of a hydroxyl-terminated polyether having a molecular weight from 800 to 2500, an aliphatic glycol containing 2 to 6 carbon atoms and an aromatic diisocyanate in a molar ratio of about 1 mol of polyether, 1 to 5 mols of glycol and an amount of diisocyanate substantially equimolar to the polyether and glycol.

8. The method of claim 6 wherein the surface of the polyurethane is heated to about 300 to 400° F.

9. The method of claim 7 wherein the surface of the polyurethane is heated to about 300 to 400° F.

References Cited

UNITED STATES PATENTS

| | | | | |
|---|---|---|---|---|
| 3,458,337 | 7/1969 | Rugg | | 117—15 |
| 3,458,340 | 7/1969 | Karsten | | 117—38 |

WILLIAM J. VAN BALEN, Primary Examiner

U.S. Cl. X.R.

117—38; 161—413

PO-1050
(5/69)

UNITED STATES PATENT OFFICE
CERTIFICATE OF CORRECTION

Patent No. 3,591,402        Dated July 6, 1971

Inventor(s) Cyrus L. Blackfan

It is certified that error appears in the above-identified patent and that said Letters Patent are hereby corrected as shown below:

Column 1, line 40, "printing" should read --printed--; line 70, "400" should read --4000--.

Column 2, line 28, after "1,2-propane" insert --diol--.

Column 6, Claim 6, line 37, "polyether" should read --polyester--.

Signed and sealed this 18th day of April 1972.

(SEAL)
Attest:

EDWARD M. FLETCHER, JR.
Attesting Officer

ROBERT GOTTSCHALK
Commissioner of Patents